United States Patent
Liu et al.

(10) Patent No.: US 8,728,349 B2
(45) Date of Patent: May 20, 2014

(54) LEAD-FREE X-RAY SHIELDING RUBBER COMPOSITE

(75) Inventors: Li Liu, Beijing (CN); Liqun Zhang, Beijing (CN); Shui Hu, Beijing (CN); Shipeng Wen, Beijing (CN); Zongyuan Wei, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 12/999,424

(22) PCT Filed: Jun. 23, 2009

(86) PCT No.: PCT/CN2009/072393
§ 371 (c)(1),
(2), (4) Date: Dec. 16, 2010

(87) PCT Pub. No.: WO2010/145082
PCT Pub. Date: Dec. 23, 2010

(65) Prior Publication Data
US 2012/0012793 A1 Jan. 19, 2012

(30) Foreign Application Priority Data
Jun. 15, 2009 (CN) .......................... 2009 1 0086453

(51) Int. Cl.
| | | |
|---|---|---|
| *G21F 1/06* | (2006.01) | |
| *G21F 1/10* | (2006.01) | |
| *G21F 3/00* | (2006.01) | |
| *G21F 3/02* | (2006.01) | |
| *G21F 5/00* | (2006.01) | |
| *G21F 7/00* | (2006.01) | |

(52) U.S. Cl.
USPC ..................... 252/478; 250/515.1; 250/516.1; 250/517.1; 250/518.1; 250/519.1

(58) Field of Classification Search
USPC ................. 252/478; 250/515.1, 516.1, 517.1, 250/518.1, 519.1
See application file for complete search history.

(56) References Cited

U.S. PATENT DOCUMENTS

2004/0262546 A1* 12/2004 Thiess et al. ............... 250/515.1
2005/0258404 A1* 11/2005 McCord ........................ 252/582
2006/0151750 A1 7/2006 Eder

FOREIGN PATENT DOCUMENTS

| CN | 1787117 A | 6/2006 |
|---|---|---|
| CN | 1789319 A | 6/2006 |
| CN | 101137285 A | 3/2008 |
| DE | 102005034384 A1 * | 2/2007 |

OTHER PUBLICATIONS

English machine translation of Liu, CN 1787117 (Jun. 2006).*
English machine translation of Wei, CN 101137285, (Mar. 2008).*
English machine translation of DE 102005034384 A1 (2007).*
International Search Report for International Application No. PCT/CN2009/072393 issued by the Chinese Patent Office, mailed on Mar. 25, 2010.

* cited by examiner

*Primary Examiner* — Peter F Godenschwager
(74) *Attorney, Agent, or Firm* — RatnerPrestia

(57) ABSTRACT

An overall lead-free X-ray shielding rubber compound material. The overall lead-free X-ray shielding rubber compound material uses rare earth mixture to replace lead, simultaneously adds metal tin and compounds thereof, metal tungsten and compounds thereof and bismuth and compounds thereof as shielding main materials and is further compounded with rubber to prepare the compound material which can realize the overall shielding and the complete lead-free property within the energy range of 40-170 kVp. When rare earth and bismuth materials are used, the way of combined use of two metal element inorganic compounds and unsaturated organic complexes is adopted, and the in-situ reaction and the compounding with a polymer matrix are carried out, thereby leading the shielding element disperse phase to form nano-micro-level dispersed particles.

11 Claims, No Drawings

LEAD-FREE X-RAY SHIELDING RUBBER COMPOSITE

CROSS-REFERENCE TO RELATED APPLICATIONS

This application is a U.S. National Phase Application of PCT International Application PCT/CN2009/072393, filed Jun. 23, 2009, which claims priority to Chinese Application No. 200910086453.x, filed Jun. 15, 2009, the contends of which are incorporated herein by reference in their entirety for all purposes.

BACKGROUND OF THE INVENTION

1. Technical Field

The present invention relates to a lead-free X-ray shielding rubber composite made of rare earth mixed with other metals and compounds.

2. Description of Related Art

The present invention discloses an X-ray shielding polymer composite featuring high shielding property, lead-free, light and soft material, good physical and mechanical property. It can be applied in the medical diagnostic X-ray machine, X-ray diffractmeter, the transmitter of the electron microscopy and the protection of the staff working with X-rays.

The development, production, promotion and application of the radiation protection material are some of the key issues on civilian hygiene protection, and also the important components of radiation protection in the nuclear energy development field and in the military field. Among the ray workers in our country, the medical diagnosis & cardiovascular Intervention treatment (X-ray machine and CT machine) X-ray workers have long been under the worst protection conditions. They need a large quantity of good quality and lightweight anti-radiation clothing & equipment. In the 21st century, the dramatic development of various fundamental researches and industrial technology developments around the nuclear energy and ray application (e.g. nuclear power station) puts forward a higher requirement for the shielding and personal protection in the fixed installations, such as buildings and equipment. The radiation protection material is also applied in the aerospace field because various moon exploration (Mars) & moon landing space probes, astronaut in-cabin clothes and astronaut out-of-cabin clothes for space walks all need high-efficient radiation protection.

The traditional radiation shielding materials mainly are made from composites of polymer matrix and lead or its compounds which act as the radiation absorbing components. The atom No. of Lead is 82. It has good energy absorption properties and high attenuation ability towards the low-energy X-ray photon, high-energy X-ray photon and γ-ray photon. However, the lead harm of the lead-contained radiation protection material shall not be ignored. As an important material in the radiation protection field, lead and its compounds have considerable demand. In China, the consumption of lead and its compounds only for medical protection clothes & equipment reaches 1000 t/a while the demand for lead and its compounds for other items, such as protection lead wall, lead plate, lead glass, lead coating and protection building materials, even reaches more than 10 thousand tons. Once these products exceed the service lives, their waste may seriously affect human health and the living environment. In order to realize the shielding effect, the protection product usually has a larger proportion of lead content, for example, if the weight of a piece of protection clothing is about 7.5 kg, then 80% of its weight comes from lead, so the harm caused by the high concentration of lead is self-evident. Lead may enter the human body through various ways, thus causing harm to the users. The waste products beyond the service life are generally disposed by landfill, thus the high-concentration lead gradually infiltrates the soil and pollutes the water. More seriously, the production environment of the lead-contained material is very harsh. Under the violent cutting and rotation of the mechanical equipment, the powder from lead and its compounds flies everywhere, so it is easy to attach to the eyes, nose and mouth, and enter the respiratory and digestive systems. Therefore, in such operational environment, it is difficult to avoid the intrusion of lead even with the best protective measures.

In terms of the radiation shielding property, lead also has defects. The absorption edge for K electron shell of the lead is 88 keV and this element has good absorption capacity towards the radiation with the energies ≥88 keV. Meanwhile, the absorption edge of the lead for L electron shell is 13 keV and has certain ray absorbing ability towards the radiation with the energy ≥13 keV, but the absorbing ability weakens quickly as the radiation energy increases, and when the radiation energy increases to 40 keV, the absorbing ability of the lead for L electron shell becomes very weak. Therefore, this energy region is named the "lead feeble absorbing area". The abovementioned result indicates that the traditional lead containing shielding material has weak absorption capacity towards the radiation with energies between 40-88 keV, but the X-ray energy generated by the medical tube voltage commonly lower than 130 kVp is in the energy range of 40-88 keV, so obvious defects exist by regarding lead as the X-ray absorption matter in this energy region.

The research on the lead-free radiation shielding material is increasingly attracting much interest, for example, some elements, like Cu, Sn, Sb, I, Ba and so on, have been looked for to substitute lead. Some new technologies have become patents and some new products have been launched. However, from the perspective of the present lead-free shielding material, these substitutes are still not satisfactory for replacing the traditional Pb contained shielding materials. In view of Cu, Sn, Sb, I, Ba commonly used in the lead-free materials at present, the absorption energies for the K electron shell of Cu, Sn, Sb and I are 9.0, 29.2, 30.5 and 33.1 keV, respectively, far away from the lower limit (40 keV) of the "lead feeble absorbing area" (40-88 keV), thus it is impossible to remedy for the Pb weak absorptive region. Barium is very active chemically. So the barium existed in the form of compounds instead of simple substance Among the Ba compounds, BaO has the highest Ba weight content), but BaO has strong alkali, high chemical toxicity and expensive price, thus reducing its utilization value.

To address the problem above and realize lead-free and high radiation shielding effect, the present invention puts forward: replace the lead with the rare earth mixture, meanwhile add tin & its compounds, bismuth & its compounds and tungsten & its compounds in the mixture as the main shielding material, and then compound with polymer matrix (rubber) to prepare the material realizes all radiation produced at the tube voltage of 40-170 kVp shielding (shielding property of the material with 2 mm thickness is the same as that of the pure lead plate with 0.5 mm thickness or higher in the different tube voltage as mentioned above, which is the commonchinese & international standard). The reasons for selecting the mixed rare earths as the main radiation absorbing components are as follows: ☐Lanthanide has unique electronic structure and numerous transition modes involving the 5d and 4f electron shells, so the absorbed X-ray energy may dissipate with the electrons transition among different energy levels. ☐ The absorption energy of K shell electron of each element of the lanthanide series rises as the atom No. increases, that is, rises from the 38.9 keV of La to the 63.3 keV of Lu, thus the energy absorption area of mixed lanthanides would cover the 40-88 key of the ray radiation.

Therefore, they can efficiently remedy the weak absorption region of lead. In addition, the radiation shielding composite containing with high atom No. & its compounds (bismuth & its compounds and/or metal tungsten & its compounds) may further improve the shielding capacity of the high-energy range (X-ray produced at the tube voltage of 130-170 kVp), while adding low atom No. element & its compounds (tin & its compounds) may improve the shielding capacity of the low-energy range (mainly refer to X-ray beams produced at 40-80 kVp), thus the lead-free composite with full shielding of the X-ray beams produced at 40-170 kVp were obtained.

In the present invention, the lanthanide series used in shielding the important energy range of x-ray produced at 70-130 kVp and bismuth used in shielding another important energy range of x-ray produced at 130-170 kVp are organically modified via the introduction of the unsaturated ligand with double bonds, in this way, to realize the fine dispersion and good interfacial compatibility of the shielding component into polymer matrix so as to improve the x-ray shielding property, physical and mechanical properties of the composite.

Russian Patent RU2054439 and RU2028331 disclose a rubber anti-X-ray composite filled with the inorganic rare earth oxides, but due to the poor compatibility between the inorganic rare earths (rare earth oxides) and rubber matrix, it is difficult to finely and homogeneously disperse the fillers in to the polymer matrix. And for this reason, it is easy to form non-filled rubber areas where the probability of interaction between the dispersed phase of shielding elements and x-ray is much lower. This kind of areas are easy to be passed through by the radiation of the high energy ray, and limit the shielding performance of the composite. Besides, we find that direct addition of a large amount of the inorganic rare earth and metal bismuth (and its inorganic compounds) in the polymer matrix may greatly reduce the comprehensive property of the composite.

For this purpose, the present invention, when using lanthanide elements and bismuth element, adopts the combination of the inorganic compound and unsaturated organic complex of the two kinds of metal elements. Take the rare earth as an example, in order to reach high shielding, high dispersion and high property, divide the rare earth into two parts with one part being an inorganic compound of the rare earth via surface modification compounding with the polymer matrix and the other part being unsaturated organic complex of the rare earth compounding with the polymer matrix via in-situ reaction. When using the bismuth, the situation is the same with the rare earth.

The in-situ reaction principles of the present invention are: design and synthesize the metal organic salt with the unsaturated bonds having reactivity, compound it with the polymer matrix and add appropriate quantity of free radical initiator (e.g. peroxide) at the same time. The free radical decomposed and produced by the peroxide at the high-temperature environment of the composite preparation leads to the self polymerization of the metal unsaturated organic complex monomer dissolved in the matrix and also caused the rubber matrix to cross-link, wherein this poly-complexes have a poorer compatibility with the matrix than that of the unsaturated organic complex monomer, easy to precipitate from the matrix and aggregate to generate the poly-complex nanoparticles (40-100 nm), at this time, the monomer concentration of the metal organic complex in the matrix decreases. The reduction of monomers in the matrix arising from the in situ reaction destroys the diffusion equilibrium, and causes more monomers to diffuse into matrix from the surface of the original dispersed crystal particles aggregated by rare earth organic complexes. The process of dissolving and diffusing will guarantee that the in-situ polymerization continues till all the complex radicals are consumed. The implementation of the in-situ reaction makes the dispersed phase of the shielding elements form nano-micron-level dispersed particles in the matrix and forms a strong chemical bonding structure between fillers and matrix. The composites prepared by in-situ reaction possess the excellent X-ray shielding property of the rare earth and other elements, and good conventional physical and mechanical property of the matrix polymer material, which realizes the high amount & high dispersion of the shielding fillers and the high strength & high shielding properties of the composite.

BRIEF SUMMARY OF THE INVENTION

The present invention puts forward: replace the lead with the rare earth mixture, meanwhile add tin & its compounds, bismuth & its compounds and tungsten & its compounds in the mixture as the main shielding component, and then compound with polymer matrix (rubber) to make the material realize full shielding in the energy range of X-ray beams produced at 40-170 kVp. The mixture of rare earth element mainly shields the energy in the range of radiation at 70-130 kVp; the mixture of bismuth & its compounds and tungsten & its compounds mainly shields the energy in the range of ray at 130-170 kVp; the mixture of tin & its compounds mainly shields the energy in the range of the ray at 40-80 kVp, thus getting lead-free composite with shielding in the energy range of the x-ray produced at 40-170 kVp. When using the rare earth and bismuth, by adopting the combination of the inorganic compound and unsaturated organic complex of the two kinds of metals, compound with the polymer matrix via in-situ reaction, thus making the dispersed phase of the shielding element form nano-micron-level dispersed particles in the matrix and forming strong chemical bonding structure between the shielding fillers and the matrix with excellent X-ray shielding property of the rare earth and other elements, and good conventional physical and mechanical property of the matrix polymer material, which realizes the high amount & high dispersion of the shielding fillers and the high strength & high shielding of the composite.

The preparation method of the lead-free X-ray shielding rubber composite of the present invention may use the common rubber processing equipment, such as open mill and internal mixer.

Its components and formula are:

| Composition | Content(phr) |
| --- | --- |
| Rubber | 50-100 |
| Rare earth organic complex | 20-300 |
| Inorganic rare earth compound | 20-500 |
| Tin | 20-500 |
| Bismuth element &/or inorganic compound | 20-550 |
| Bismuth organic complex | 20-230 |
| Tungsten | 20-260 |
| Silane coupling agent | 0.5-10 |

-continued

| Composition | Content(phr) |
|---|---|
| Softener | 2-30 |
| Crosslinker | 2-15 |
| In-situ reaction initiator | 0.2-3 |

(phr = grams per 100 g of rubber)

The rubber includes natural rubber and synthetic rubber, wherein the synthetic rubber mainly includes ethylene propylene diene monomer rubber, styrene-butadiene rubber, nitrile rubber, acrylic rubber and hydrogenated nitrile-butadiene rubber.

The following shielding agents are all micron-level powder.

The rare earth organic complexes are the rare earth salt with unsaturated carboxylic group (including acrylic rare earth salt, methacrylic rare earth salt and undecylenic rare earth salt), and the rare earth elements used are 16 kinds of elements in the lanthanide series (except for promethium). The inorganic rare earth compounds are rare earth oxide, rare earth chloride, rare earth carbonate, rare earth hydride and rare earth hydroxide. The rare earth elements used are 16 kinds of elements of the lanthanide series (except for promethium). The chemical form of tin is metal element or tin oxide, tin chloride, tin sulfide and tin fluoride. The chemical form of the bismuth inorganic compound is bismuth oxide and bismuth sulfide. Bismuth organic complex refers to carboxylic bismuth salt (including acrylic bismuth salt, methacrylic bismuth salt and undecylenic bismuth salt); the chemical form of tungsten is its metal element or tungsten carbide, tungsten sulfide, tungsten salts and tungsten halide.

Silane coupling agent refers to bis (triethoxysilyl propyl) tetrasulfide (Si69), vinyl tirethoxy silane (A-151) or γ-aminopropyl vinyl tirethoxy silane (KH550). Softener of oil series refers to alkane oil, aromatic oil or engine oil; synthetic plasticizer refers to dibutyl phthalate, dioctyl phthalate or epoxidized soybean oil. Crosslinker refers to sulfur, peroxide or phenolic resin. When the crosslinker refers to peroxide which at the same time acts as the in-situ reaction initiator, as mentioned in Embodiment 5, dicumylperoxide acts as the crosslinker and the in-situ reaction initiator at the same time. However, the consumption amount of the dicumylperoxid is in 2.2-18 phr, that is, it is still within the combined consumption range of the crosslinker and the in-situ reaction initiator. In-situ reaction initiator refers to dicumyl peroxide and benzoyl peroxide. When the crosslinker refers to sulfur, the accelerator added is the thiazole accelerator, sulfonamide accelerator or thiuram accelerator. Meanwhile, add 1-5 phr of the zinc oxide and 1-10 phr of the stearic acid of the following weight phr.

During the preparation of the composite, mix the rubber & additive, rare earth organic complex, inorganic rare earth compound, tin, tin inorganic compound, bismuth, bismuth organic complex, tungsten and tungsten inorganic compound step by step according to the proportions above and then heat the compounds for vulcanization and getting the composite. Specifically:

Step 1: Add the rubber, rare earth organic complex, bismuth organic complex and in-situ reaction initiator into the internal mixer at the same time, shear them quickly at 130° C. and react for about 4 minutes. During this process, with the induction of the free radial generated by means of the peroxide decomposition, the rare earth organic complex take part in the in-situ self polymerization, the grafting reaction, and other reactions with the rubber matrix. Simultaneously, under the strong shearing of the rotors and the high processing viscosity of rubber at a high temperature, the rare earth organic complex particle with bigger size is stripped gradually and becomes smaller, which improves the dispersed uniformity of the rare earth organic complex in the rubber. After completing the dynamic in-situ self-polymerization and the in-situ reaction of the rare earth organic complex, remove the rubber. (Note: sulfur, other crosslinker and the additive used for crosslink rubber are prohibited from adding in this process.)

Step 2: Band the double-roller of the open mill with the mixed rubber made above, add the additive (such as zinc oxide, stearic acid and accelerator), inorganic rare earth compound, tin or tin inorganic compound, bismuth or bismuth inorganic compound and tungsten or tungsten inorganic compound, this process is completed at a normal temperature, under the double factors of the strong shearing and high viscosity of the rubber, the high effective dispersion of the all additives are guaranteed with the operation lasting for 40 minutes. Afterward, add the silane coupling agent, softener and crosslinker and get the final compounds. (Note: sulfur, other crosslinker and the additive used for crosslink rubber are added in this process.)

Through the observation of the transmission electron microscopy, we find that, although high amount of the rare earth and the bismuth in the composites is adopted, but due to the implementation of the in-situ dispersion technology towards the rare earth & bismuth organic complex during the preparation, rare earth & bismuth organic complex both can be distributed evenly in the matrix and have a good interfacial adhension with the matrix, thus conducive to improving the shielding property. From the photos of the transmission electron microscopy, we find that the free radial decomposed by the in-situ reaction initiator at the high temperature in the composite leads to the self polymerization of the metal unsaturated organic complex monomer, wherein the poly-complex aggregate to generates the metal organic salt polymer with the nano-particle size of 40-100 nm. The implementation of the in-situ reaction makes the dispersed phase of the shielding element form the nano-micron-level dispersion particle in the matrix and forms a strong chemical bonding structure. The composites prepared by in-situ reaction possess the excellent X-ray shielding property of the rare earths and other elements, and good conventional physical and mechanical property.

The present invention is further detailed in combination with the embodiments.

DETAILED DESCRIPTION OF THE INVENTION

Embodiment 1

Add 100 phr of natural rubber, 10 phr of acrylic praseodymium, 10 phr of acrylic neodymium, 20 phr of undecylenic bismuth and 0.8 share of dicumyl peroxide (in-situ reaction initiator) into the internal mixer at the same time, shear them quickly at 130° C., react for about 4 minutes and get the compounds.

At normal temperature, band the double-roller on the open mill with the compounds made above, add 200 phr of acrylic neodymium, 150 phr of samarium oxide and 150 phr of gadolinium oxide step by step, and also add 150 phr of tin, 80 phr of bismuth and 120 phr of tungsten at the same time for mixing for 20 minutes, afterwards, add 5 phr of zinc oxide and 2 phr of stearic acid in sequence and mix for 2 minutes; add 1.5 phr of Accelerator CZ and mix for 2 minutes; then add 10 phr of naphthenic oil and mix for 20 minutes and add 0.5 share of Si69 and mix for 2 minutes; finally, add 3 phr of sulfur into the open mill for vulcanization, thus producing the composite.

The said Accelerator CZ refers to N-cyclohexyl-2-phenyl benzothiazole sulfonamide; Si69 refers to bis (triethoxysilyl propyl) tetrasulfide.

Embodiment 2

Add 100 phr of natural rubber, 160 phr of methacrylic gadolinium, 140 phr of methacrylic neodymium, 30 phr of acrylic bismuth and 3 phr of dicumyl peroxide (in-situ reaction initiator) into the internal mixer at the same time, cut them quickly at 130° C., react for about 4 minutes and get the compounds.

At normal temperature, band the double-roller on the open mill with the compounds made above, add 50 phr of samarium oxide, 80 phr of europium oxide, 300 phr of tin sulfide, 100 phr of bismuth oxide and 260 phr of tungsten carbide for mixing for 20 minutes; then add 5 phr of zinc oxide, 2 phr of stearic acid for mixing for 2 minutes; add 1.8 phr of Accelerator CZ for mixing for 2 minutes; add 8 phr of naphthenic oil for mixing for 20 minutes and add 10 phr of Si69 coupling agent for mixing for 2 minutes; finally, add 3 phr of sulfur into the open mill for vulcanization and forming, thus getting the composite.

Embodiment 3

Add 100 phr of natural rubber, 100 phr of methacrylic gadolinium, 80 phr of methacrylic neodymium, 50 phr of methacrylic bismuth, 1.4 phr of dicumyl peroxide (in-situ reaction initiator) into the internal mixer at the same time, cut them quickly at 130° C., react for about 4 minutes and get the compounds.

At normal temperature, band the double-roller on the open mill with the compounds made above, add 200 phr of samarium oxide, 100 phr of gadolinium oxide, 100 phr of tin sulfide, 300 phr of bismuth oxide and 220 phr of tungsten for mixing for 20 minutes; then add 5 phr of zinc oxide, 2 phr of stearic acid for mixing for 2 minutes; add 2 phr of Accelerator CZ and 0.2 share of Accelerator TT and mix for 2 minutes; add 12 phr of naphthenic oil at the same time for mixing for 20 minutes and add 0.5 phr of Si69 for mixing for 2 minutes; finally, add 3 phr of sulfur into the open mill for mixing for 2 minutes for vulcanization and forming, thus getting the composite.

The said Accelerator TT refers to the tetramethyl thiuram disulfide.

Embodiment 4

Add 50 phr of ethylene propylene rubber, 100 phr of acrylic samarium, 140 phr of methacrylic bismuth and 1.5 phr of dicumyl peroxide (in-situ reaction initiator) into the internal mixer at the same time, cut them quickly at 130° C., react for about 4 minutes and get the compounds.

At normal temperature, band the double-roller on the open mill with the compounds made above, add 150 phr of terbium oxide, 100 phr of samarium carbide, 120 phr of tin oxide, 80 phr of tungsten carbide, 20 phr of bismuth oxide, then add 5 phr of zinc oxide, 2 phr of stearic acid for mixing for 2 minutes; add 2 phr of Accelerator CZ and 0.2 share of Accelerator TT for mixing for 2 minutes; add 30 phr of paraffin oil at the same time for mixing for 20 minutes and add 5 phr of A151 for mixing for 2 minutes; finally, add 6 phr of crosslinker sulfur for mixing for 2 minutes for vulcanization and forming, thus getting the composite.

Embodiment 5

Add 50 phr of ethylene-propylene rubber, 80 phr of acrylic europium, 100 phr of undecylenic bismuth and 1 share of dicumyl peroxide (in-situ reaction initiator) into the internal mixer at the same time, cut them quickly at 130° C., react for about 4 minutes and get the compounds.

At normal temperature, band the double-roller on the open mill with the compounds made above, add 80 phr of terbium oxide, 100 phr of europium oxide, 110 phr of tin, 80 phr of tin oxide, 80 phr of bismuth oxide and 100 phr of tungsten in sequence; add 2 phr of paraffin oil at the same time for mixing for 20 minutes and add 1.2 phr of A151 for mixing for 2 minutes; finally, add 2 phr of dicumyl peroxide of the crosslinker for mixing for 2 minutes for vulcanization and forming, thus getting the composite.

Embodiment 6

Add 50 phr of ethylene-propylene rubber, 150 phr of undecylenic dysprosium, 40 phr of acrylic bismuth and 0.8 share of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 100 phr of lutetium oxide, 100 phr of samarium oxide, 200 phr of tin oxide, 100 phr of bismuth oxide and 120 phr of tungsten carbide, then add 5 phr of zinc oxide and 2 phr of stearic acid for mixing for 2 minutes; add 2 phr of Accelerator CZ and 0.2 share of Accelerator TT for mixing for 2 minutes in sequence; add 30 phr of naphthenic oil in sequence at the same time for mixing for 20 minutes and add 5 phr of A151 for mixing for 2 minutes; finally, add 6 phr of crosslinker sulfur for mixing for 2 minutes for vulcanization and forming, thus getting the composite.

Embodiment 7

Add 50 phr of ethylene-propylene rubber, 150 phr of acrylic neodymium, 100 phr of acrylic bismuth and 1 share of dicumyl peroxide (in-situ reaction initiator) into the internal mixer at the same time, cut them quickly at 130° C., react for about 4 minutes and get the compounds.

At normal temperature, band the double-roller on the open mill with the compounds made above, add 80 phr of samarium chloride, 80 phr of gadolinium oxide, 120 phr of terbium oxide, 110 phr of tin fluoride, 150 phr of tungsten and 20 phr of bismuth oxide, and at the same time add 10 phr of paraffin oil in sequence for mixing for 20 minutes and add 1.2 phr of A151 for mixing for 2 minutes; finally, add 2 phr of dicumyl peroxide of the crosslinker for mixing for 2 minutes for vulcanization and forming, thus getting the composite.

Embodiment 8

Add 100 phr of acrylic rubber, 150 phr of acrylic europium, 230 phr of methacrylic bismuth and 2.5 phr of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 100 phr of cerium carbonate, 200 phr of europium oxide, 200 phr of terbium oxide, 100 phr of tin, 150 phr of tungsten and 30 phr of bismuth oxide for mixing for 20 minutes and then add 1 share of triethylene tetramine for mixing for 2 minutes; at the same time add 20 phr of dibutyl phthalate for mixing for 20 minutes and 1.5 phr of KH550 for mixing for 2 minutes; finally, add 2 phr of sulfur into the open mill for mixing for 2 minutes for vulcanization and forming, thus getting the composite.

Embodiment 9

Add 100 phr of acrylic rubber, 200 phr of acrylic cerium, 30 phr of acrylic bismuth and 0.8 share of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 80 phr of praseodymium oxide, 80 phr of gadolinium oxide, 80 phr of terbium oxide, 500 phr of tin sulfide, 100 phr of bismuth oxide and 120 phr of tungsten sulfide and mix for 20 minutes and then add 1 share of triethylene tetramine and mix for 2 minutes; at the same time add 18 phr of dibutyl phthalate and mix for 20 minutes and 2 phr of KH550 and mix for 2 minutes; finally, add 2 phr of sulfur into the open mill and mix for 2 minutes for vulcanization and forming, thus getting the composite.

Embodiment 10

Add 80 phr of nitrile rubber, 50 phr of acrylic dysprosium, 30 phr of methacrylic bismuth and 0.2 share of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 200 phr of cerium carbonate, 200 phr of europium oxide, 100 phr of terbium oxide, 20 phr of tin, 230 phr of bismuth oxide and 200 phr of tungsten carbide and mix for 20 minutes and then add 3 phr of zinc oxide and 2 phr of stearic acid in sequence and mix for 2 minutes; add 2 phr of Accelerator DM and 1.0 share of Accelerator D and mix for 2 minutes; at the same time add 30 phr of dioctyl phthalate and mix for 20 minutes and 2.5 phr of KH550 and mix for 2 minutes; finally, add 4 phr of sulfur into the open mill and mix for 2 minutes for vulcanization and forming, thus getting the composite. The said Accelerator DM refers to dibenzothiazyl disulfide while Accelerator D refers to diphenyl guanidine.

Embodiment 11

Add 80 phr of nitrile rubber, 100 phr of acrylic samarium, 20 phr of acrylic bismuth and 0.8 share of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 80 phr of cerium carbonate, 100 phr of gadolinium oxide, 100 phr of terbium carbonate, 300 phr of tin chloride, 100 phr of bismuth sulfide and 150 phr of tungsten sulfide and mix for 20 minutes; then add 5 phr of zinc oxide and 2 phr of stearic acid in sequence and mix for 2 minutes; add 2 phr of Accelerator DM and 1 share of Accelerator D and mix for 2 minutes; at the same time add 30 phr of dioctyl phthalate and mix for 20 minutes and 2.5 phr of KH550 and mix for 2 minutes; finally, add 4 phr of sulfur into the open mill for vulcanization and forming, thus getting the composite.

Embodiment 12

Add 80 phr of nitrile rubber, 150 phr of acrylic europium, 20 phr of undecylenic bismuth and 1 share of benzoyl peroxide (in-situ reaction initiator) into the internal mixer at the same time, cut them quickly at 130° C., react for about 4 minutes and get the compounds.

At a normal temperature, band the double-roller on the open mill with the compounds made above, add 150 phr of samarium hydroxide, 60 phr of gadolinium oxide, 50 phr of terbium carbonate, 200 phr of tin, 80 phr of bismuth and 20 phr of tungsten and mix for 20 minutes; then add 3 phr of zinc oxide and 2 phr of stearic acid in sequence and mix for 2 minutes; add 2 phr of Accelerator DM and 1 share of Accelerator D and mix for 2 minutes; at the same time add 30 phr of dioctyl phthalate and mix for 20 minutes and 2.5 phr of KH550 and mix for 2 minutes; finally, add 4 phr of sulfur into the open mill for vulcanization and forming, thus getting the composite.

Embodiment 13

Add 80 phr of nitrile rubber, 150 phr of acrylic terbium, 100 phr of methacrylic samarium, 150 phr of methacrylic bismuth and 3 phr of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 200 phr of lanthanum oxide, 100 phr of europium oxide, 80 phr of tin, 150 phr of tin fluoride, 100 phr of tungsten chloride and 30 phr of bismuth oxide and mix for 20 minutes; then add 3 phr of zinc oxide and 2 phr of stearic acid in sequence and mix for 2 minutes; add 2 phr of Accelerator DM and 1 share of Accelerator D and mix for 2 minutes; at the same time add 30 phr of dioctyl phthalate and mix for 20 minutes and 2.5 phr of KH550 and mix for 2 minutes; finally, add 3 phr of sulfur into the open mill for vulcanization and forming, thus getting the composite.

Embodiment 14

Add 70 phr of hydrogenated nitrile-butadiene rubber, 20 phr of acrylic terbium, 20 phr of acrylic samarium, 40 phr of methacrylic cerium, 40 phr of methacrylic samarium, 230 phr of methacrylic bismuth and 1.2 phr of dicumyl peroxide (in-situ reaction initiator) into the internal mixer at the same time, cut them quickly at 130° C., react for about 4 minutes and get the compounds.

At normal temperature, band the double-roller on the open mill with the compounds made above, add 200 phr of samarium oxide, 200 phr of cerium oxide, 20 phr of tin, 100 phr of tin oxide, 20 phr of bismuth oxide and 100 phr of tungsten, add 2 phr of epoxidized soybean oil and mix for 20 minutes and then add 2.5 phr of KH550 and mix for 2 minutes; finally, add 15 phr of phenolic resin into the open mill and mix for 2 minutes for vulcanization and forming, thus getting the composite.

Embodiment 15

Add 70 phr of hydrogenated nitrile-butadiene rubber, 40 phr of acrylic terbium, 20 phr of acrylic holmium, 40 phr of methacrylic gadolinium, 60 phr of methacrylic samarium, 150 phr of methacrylic bismuth and 2 phr of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 200 phr of samarium oxide, 150 phr of cerium oxide, 100 phr of tin, 120 phr of tin oxide, 100 phr of bismuth oxide and 120 phr of tungsten, add 10 phr of paraffin oil and mix for 20 minutes and then add 3 phr of KH550 and mix for 2 minutes; finally, add 15 phr of phenolic resin into the open mill and mix for 2 minutes for vulcanization and forming, thus getting the composite.

Embodiment 16

Add 100 phr of hydrogenated nitrile-butadiene rubber, 60 phr of acrylic samarium, 20 phr of acrylic terbium, 60 phr of methacrylic cerium, 80 phr of methacrylic samarium, 100 phr of methacrylic bismuth and 2 phr of dicumyl peroxide (in-situ reaction initiator) into the internal mixer at the same time, cut them quickly at 130° C., react for about 4 minutes and get the compounds.

At normal temperature, band the double-roller on the open mill with the compounds made above, add 150 phr of neodymium oxide, 150 phr of cerium oxide, 150 phr of tin, 120 phr of tin oxide, 150 phr of bismuth oxide and 150 phr of tungsten, add 20 phr of epoxidized soybean oil and mix for 20 minutes and then add 3 phr of KH550 and mix for 2 minutes; finally, add 15 phr of phenolic resin into the open mill and mix for 2 minutes for vulcanization and forming, thus getting the composite.

Embodiment 17

Add 100 phr of hydrogenated nitrile-butadiene rubber, 80 phr of acrylic neodymium, 40 phr of acrylic terbium, 80 phr of methacrylic cerium, 100 phr of methacrylic samarium, 50 phr of methacrylic bismuth and 2 phr of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 100 phr of samarium oxide, 200 phr of cerium oxide, 200 phr of tin, 100 phr of tin oxide, 300 phr of bismuth oxide and 180 phr of tungsten carbide, add 20 phr of epoxidized soybean oil and mix for 20 minutes and then add 2 phr of KH550 and mix for 2 minutes; finally, add 2 phr of dicumyl peroxide of the crosslinker into the open mill and mix for 2 minutes for vulcanization and forming, thus getting the composite.

Embodiment 18

Add 100 phr of styrene-butadiene rubber, 80 phr of acrylic samarium, 100 phr of methacrylic terbium, 30 phr of methacrylic bismuth and 2 phr of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 110 phr of gadolinium oxide, 100 phr of europium oxide, 200 phr of tin sulfide, 20 phr of bismuth, 20 phr of tungsten and 100 phr of tungsten sulfide and mix for 20 minutes; then add 4 phr of zinc oxide and 3 phr of stearic acid in sequence and mix for 2 minutes; add 2 phr of Accelerator CZ and 0.1 share of Accelerator TT and mix for 2 minutes; at the same time add 30 phr of dioctyl phthalate and mix for 20 minutes and 2.5 phr of A151 and mix for 2 minutes; finally, add 10 phr of sulfur into the open mill for vulcanization and forming, thus getting the composite.

Embodiment 19

Add 100 phr of styrene-butadiene rubber, 200 phr of acrylic terbium, 100 phr of methacrylic gadolinium, 100 phr of undecylenic bismuth and 1.6 phr of dicumyl peroxide (in-situ reaction initiator) into the internal mixer at the same time, cut them quickly at 130° C., react for about 4 minutes and get the compounds.

At a normal temperature, band the double-roller on the open mill with the compounds made above, add 10 phr of samarium oxide, 10 phr of europium oxide, 150 phr of tin oxide, 130 phr of bismuth, 20 phr of bismuth oxide and 100 phr of tungsten and mix for 20 minutes; then add 5 phr of zinc oxide and 2 phr of stearic acid in sequence and mix for 2 minutes; add 2 phr of Accelerator CZ and 0.2 share of Accelerator TT and mix for 2 minutes; at the same time add 30 phr of dioctyl phthalate and mix for 20 minutes and 2.5 phr of A151 and mix for 2 minutes; finally, add 4 phr of sulfur into the open mill for vulcanization and forming, thus getting the composite.

Embodiment 20

Add 100 phr of styrene-butadiene rubber, 50 phr of acrylic cerium, 100 phr of europium methacrylic, 80 phr of methacrylic bismuth and 0.8 phr of dicumyl peroxide (in-situ reaction initiator) into the internal mixer at the same time, cut them quickly at 130° C., react for about 4 minutes and get the compounds.

At a normal temperature, add 100 phr of gadolinium oxide, 120 phr of cerium oxide, 100 phr of tin oxide, 550 phr of bismuth oxide, 150 phr of tungsten and 20 phr of tungsten sulfide and mix for 20 minutes; then add 5 phr of zinc oxide and 3 phr of stearic acid in sequence and mix for 2 minutes; add 2 phr of Accelerator CZ and 0.1 share of Accelerator TT and mix for 2 minutes; at the same time add 30 phr of dioctyl phthalate and mix for 20 minutes and 2.5 phr of Si69 and mix for 2 minutes; finally, add 4 phr of sulfur into the open mill for vulcanization and forming, thus getting the composite.

| Embodiments | Property | | | | |
|---|---|---|---|---|---|
| | Lead equivalent per unit thickness* (mmPb/mm) | Hardness (Shore A) | Tensile strength (MPa) | Elongation at break (%) | Permanent deformation (%) |
| 1 40 kVp | 0.25 | 84 | 10.1 | 350 | 36 |
| 60 kVp | 0.27 | | | | |
| 80 kVp | 0.30 | | | | |
| 100 kVp | 0.31 | | | | |
| 120 kVp | 0.27 | | | | |
| 150 kVp | 0.25 | | | | |
| 170 kVp | 0.25 | | | | |
| 2 40 kVp | 0.25 | 86 | 13.8 | 360 | 34 |
| 60 kVp | 0.29 | | | | |
| 80 kVp | 0.26 | | | | |
| 100 kVp | 0.26 | | | | |
| 120 kVp | 0.28 | | | | |
| 150 kVp | 0.25 | | | | |
| 170 kVp | 0.25 | | | | |

| Embodiments | | Lead equivalent per unit thickness* (mmPb/mm) | Hardness (Shore A) | Tensile strength (MPa) | Elongation at break (%) | Permanent deformation (%) |
|---|---|---|---|---|---|---|
| 3 | 40 kVp | 0.25 | 88 | 12.5 | 340 | 36 |
|  | 60 kVp | 0.25 | | | | |
|  | 80 kVp | 0.27 | | | | |
|  | 100 kVp | 0.28 | | | | |
|  | 120 kVp | 0.31 | | | | |
|  | 150 kVp | 0.3 | | | | |
|  | 170 kVp | 0.25 | | | | |
| 4 | 40 kVp | 0.25 | 84 | 6.5 | 220 | 24 |
|  | 60 kVp | 0.25 | | | | |
|  | 80 kVp | 0.26 | | | | |
|  | 100 kVp | 0.26 | | | | |
|  | 120 kVp | 0.28 | | | | |
|  | 150 kVp | 0.25 | | | | |
|  | 170 kVp | 0.25 | | | | |
| 5 | 40 kVp | 0.25 | 86 | 5.3 | 200 | 26 |
|  | 60 kVp | 0.27 | | | | |
|  | 80 kVp | 0.26 | | | | |
|  | 100 kVp | 0.25 | | | | |
|  | 120 kVp | 0.3 | | | | |
|  | 150 kVp | 0.26 | | | | |
|  | 170 kVp | 0.25 | | | | |
| 6 | 40 kVp | 0.25 | 87 | 4.6 | 300 | 26 |
|  | 60 kVp | 0.27 | | | | |
|  | 80 kVp | 0.26 | | | | |
|  | 100 kVp | 0.25 | | | | |
|  | 120 kVp | 0.26 | | | | |
|  | 150 kVp | 0.25 | | | | |
|  | 170 kVp | 0.25 | | | | |
| 7 | 40 kVp | 0.25 | 84 | 6.7 | 200 | 20 |
|  | 60 kVp | 0.25 | | | | |
|  | 80 kVp | 0.25 | | | | |
|  | 100 kVp | 0.26 | | | | |
|  | 120 kVp | 0.29 | | | | |
|  | 150 kVp | 0.25 | | | | |
|  | 170 kVp | 0.25 | | | | |
| 8 | 40 kVp | 0.25 | 80 | 6.1 | 360 | 26 |
|  | 60 kVp | 0.26 | | | | |
|  | 80 kVp | 0.30 | | | | |
|  | 100 kVp | 0.31 | | | | |
|  | 120 kVp | 0.29 | | | | |
|  | 150 kVp | 0.27 | | | | |
|  | 170 kVp | 0.25 | | | | |
| 9 | 40 kVp | 0.25 | 85 | 5.4 | 320 | 22 |
|  | 60 kVp | 0.31 | | | | |
|  | 80 kVp | 0.27 | | | | |
|  | 100 kVp | 0.26 | | | | |
|  | 120 kVp | 0.26 | | | | |
|  | 150 kVp | 0.25 | | | | |
|  | 170 kVp | 0.25 | | | | |
| 10 | 40 kVp | 0.25 | 89 | 4.6 | 560 | 26 |
|  | 60 kVp | 0.25 | | | | |
|  | 80 kVp | 0.26 | | | | |
|  | 100 kVp | 0.27 | | | | |
|  | 120 kVp | 0.29 | | | | |
|  | 150 kVp | 0.29 | | | | |
|  | 170 kVp | 0.25 | | | | |
| 11 | 40 kVp | 0.25 | 88 | 5.8 | 400 | 26 |
|  | 60 kVp | 0.29 | | | | |
|  | 80 kVp | 0.27 | | | | |
|  | 100 kVp | 0.26 | | | | |
|  | 120 kVp | 0.28 | | | | |
|  | 150 kVp | 0.28 | | | | |
|  | 170 kVp | 0.25 | | | | |
| 12 | 40 kVp | 0.25 | 86 | 7.8 | 300 | 30 |
|  | 60 kVp | 0.29 | | | | |
|  | 80 kVp | 0.25 | | | | |
|  | 100 kVp | 0.25 | | | | |
|  | 120 kVp | 0.25 | | | | |
|  | 150 kVp | 0.25 | | | | |
|  | 170 kVp | 0.25 | | | | |
| 13 | 40 kVp | 0.25 | 87 | 10.2 | 150 | 36 |
|  | 60 kVp | 0.26 | | | | |
|  | 80 kVp | 0.27 | | | | |
|  | 100 kVp | 0.28 | | | | |
|  | 120 kVp | 0.28 | | | | |
|  | 150 kVp | 0.25 | | | | |
|  | 170 kVp | 0.25 | | | | |
| 14 | 40 kVp | 0.25 | 80 | 14.6 | 350 | 16 |
|  | 60 kVp | 0.26 | | | | |
|  | 80 kVp | 0.29 | | | | |
|  | 100 kVp | 0.29 | | | | |
|  | 120 kVp | 0.27 | | | | |
|  | 150 kVp | 0.26 | | | | |
|  | 170 kVp | 0.25 | | | | |
| 15 | 40 kVp | 0.25 | 83 | 13.2 | 300 | 18 |
|  | 60 kVp | 0.28 | | | | |
|  | 80 kVp | 0.28 | | | | |
|  | 100 kVp | 0.28 | | | | |
|  | 120 kVp | 0.28 | | | | |
|  | 150 kVp | 0.27 | | | | |
|  | 170 kVp | 0.25 | | | | |
| 16 | 40 kVp | 0.25 | 85 | 12 | 320 | 16 |
|  | 60 kVp | 0.29 | | | | |
|  | 80 kVp | 0.28 | | | | |
|  | 100 kVp | 0.28 | | | | |
|  | 120 kVp | 0.29 | | | | |
|  | 150 kVp | 0.28 | | | | |
|  | 170 kVp | 0.25 | | | | |
| 17 | 40 kVp | 0.25 | 88 | 11.4 | 350 | 14 |
|  | 60 kVp | 0.30 | | | | |
|  | 80 kVp | 0.29 | | | | |
|  | 100 kVp | 0.29 | | | | |
|  | 120 kVp | 0.29 | | | | |
|  | 150 kVp | 0.3 | | | | |
|  | 170 kVp | 0.25 | | | | |
| 18 | 40 kVp | 0.25 | 78 | 4.6 | 350 | 26 |
|  | 60 kVp | 0.27 | | | | |
|  | 80 kVp | 0.25 | | | | |
|  | 100 kVp | 0.25 | | | | |
|  | 120 kVp | 0.27 | | | | |
|  | 150 kVp | 0.26 | | | | |
|  | 170 kVp | 0.25 | | | | |
| 19 | 40 kVp | 0.25 | 76 | 6.8 | 360 | 22 |
|  | 60 kVp | 0.26 | | | | |
|  | 80 kVp | 0.25 | | | | |
|  | 100 kVp | 0.25 | | | | |
|  | 120 kVp | 0.27 | | | | |
|  | 150 kVp | 0.29 | | | | |
|  | 170 kVp | 0.25 | | | | |
| 20 | 40 kVp | 0.25 | 84 | 3.8 | 320 | 24 |
|  | 60 kVp | 0.25 | | | | |
|  | 80 kVp | 0.25 | | | | |
|  | 100 kVp | 0.26 | | | | |
|  | 120 kVp | 0.29 | | | | |
|  | 150 kVp | 0.31 | | | | |
|  | 170 kVp | 0.25 | | | | |

*Lead equivalent per unit thickness in the form refers to the composite of unit thickness (mm) equivalent to the thickness value of the pure lead plate; the higher the thickness value, the better the shielding property.

What is claimed is:
1. A lead-free X-ray shielding rubber compound material, comprising:

| Compositions | Content(phr) |
|---|---|
| Rubber | 50-100 |
| Polymerized rare earth organic complex | 20-300 |

-continued

| Compositions | Content(phr) |
| --- | --- |
| Inorganic rare earth compound | 20-500 |
| Metal tin &/or tin compound | 20-500 |
| Bismuth element &/or inorganic compound | 20-550 |
| Polymerized bismuth organic complex | 20-230 |
| Metal tungsten &/or tungsten compound | 20-260 |
| Silane coupling agent | 0.5-10 |
| Softener | 2-30 |
| Crosslinker | 2-15 |
| In-situ reaction initiator | 0.2-3 | where, phr equals grams per 100 g of the rubber,
wherein the rare earth organic complex is an unsaturated carboxylic rare earth salt, and the rare earth element in the rare earth organic complex is selected from a group consisting of the elements of the lanthanide series except for promethium; wherein the inorganic rare earth compound is selected from the group consisting of rare earth oxide, rare earth chloride, rare earth carbonate, rare earth hydride and rare earth hydroxide, and the rare earth element in the inorganic rare earth compound is selected from the group consisting of 16 kinds of elements of the lanthanide series except for promethium; wherein the tin compound is selected from the group consisting of tin oxide, tin chloride, tin sulfide and tin fluoride; wherein the bismuth inorganic compound is bismuth oxide or bismuth sulfide; wherein the bismuth organic complex is an unsaturated carboxylic bismuth salt; wherein the tungsten compound is selected from the group consisting of tungsten carbide, tungsten sulfide, tungsten salts and tungsten halide; wherein the lead-free X-ray shielding rubber compound material comprises particles having a size of 40-100 nm; and wherein the particles comprise the polymerized rare earth organic complex and the polymerized bismuth organic complex.

2. The lead-free X-ray shielding rubber compound material of claim 1, wherein the rubber is natural rubber or synthetic rubber, and wherein the synthetic rubber is selected from the group consisting of ethylene propylene dienemonomer rubber, styrene-butadiene rubber, nitrile rubber, acrylic rubber and hydrogenated nitrile-butadiene rubber.

3. The lead-free X-ray shielding rubber compound material of claim 1, wherein the unsaturated carboxylic rare earth salt is acrylic rare earth salt, methacrylic rare earth salt or undecylenic rare earth salt; or wherein the bismuth organic complex is acrylic bismuth salt, methacrylic bismuth salt or undecylenic bismuth salt.

4. The lead-free X-ray shielding rubber compound material of claim 1, further comprising an accelerator, wherein the accelerator is a thiazole accelerator, a sulfenamide accelerator or a thiuram accelerator.

5. The lead-free X-ray shielding rubber compound material of claim 1, wherein the crosslinker is sulfur, peroxide or phenolic resin.

6. The lead-free X-ray shielding rubber compound material of claim 1, wherein the silane coupling agent is bis (triethoxysilyl propyl) tetrasulfide, vinyl tirethoxy silane (A-151) or y-aminopropyl vinyl tirethoxy silane.

7. The lead-free X-ray shielding rubber compound material of claim 1, wherein the in-situ reaction initiator is dicumyl peroxide or benzoyl peroxide.

8. The lead-free X-ray shielding rubber compound material of claim 1, further comprising 1-5 parts per hundred rubber (phr) of zinc oxide and 1-10 parts per hundred rubber (phr) of stearic acid by weight.

9. The lead-free X-ray shielding rubber compound material of claim 1, further comprising 0.5-3 parts per hundred rubber (phr) of accelerator by weight.

10. The lead-free X-ray shielding rubber compound material of claim 1, wherein the softener is alkane oil, aromatic oil or engine oil.

11. The lead-free X-ray shielding rubber compound material of claim 1, further comprising a synthetic plasticizer, wherein the synthetic plasticizer is dibutyl phthalate, dioctyl phthalate or epoxidized soybean oil.

* * * * *